US006717641B2

(12) United States Patent
Arai (10) Patent No.: US 6,717,641 B2
(45) Date of Patent: Apr. 6, 2004

(54) LIQUID CRYSTAL DISPLAY DEVICE

(75) Inventor: Makoto Arai, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 167 days.

(21) Appl. No.: 09/764,211

(22) Filed: Jan. 19, 2001

(65) Prior Publication Data

US 2001/0043297 A1 Nov. 22, 2001

(30) Foreign Application Priority Data

Jan. 21, 2000 (JP) ........................................ 2000-012449

(51) Int. Cl.$^7$ .............................................. G02F 1/335
(52) U.S. Cl. ............................ 349/114; 349/64; 349/98
(58) Field of Search ............................ 349/194, 98, 96, 349/114, 64

(56) References Cited

U.S. PATENT DOCUMENTS

| 5,559,618 | A | * | 9/1996 | Mori | 349/117 |
| 6,023,317 | A | * | 2/2000 | Xu et al. | 349/120 |
| 6,025,897 | A | * | 2/2000 | Weber et al. | 349/96 |
| 6,233,029 | B1 | * | 5/2001 | Iijima et al. | 349/96 |
| 6,246,455 | B1 | * | 6/2001 | Iijima et al. | 349/65 |
| 6,300,989 | B1 | * | 10/2001 | Iijima | 349/96 |
| 6,359,668 | B1 | * | 3/2002 | Iijima et al. | 349/61 |

FOREIGN PATENT DOCUMENTS

JP            54-153066           12/1979

* cited by examiner

*Primary Examiner*—Kenneth Parker
(74) *Attorney, Agent, or Firm*—Westerman, Hattori, Daniels & Adrian, LLP (57) ABSTRACT

A TN liquid crystal cell constituted by sandwiching a nematic liquid crystal which is aligned at a twist angle of about 90° between a first and a second transparent substrate each of which has transparent electrodes is used, an absorption-type polarizing film is provided on the outside, which is the visible side, of the second substrate, and a reflection-type polarizing film, a scattering layer, and a mirror reflector are provided in order on the outside, which is the opposite side to the visible side of the TN liquid crystal cell, of the first substrate, thereby constituting a liquid crystal display device for performing a reflection display of information of character and image in an achromatic metallic tone within a bright diffused white background.

10 Claims, 8 Drawing Sheets

LIQUID CRYSTAL DISPLAY DEVICE

BACKGROUND OF THE INVENTION

1. Field of the Invention

The present invention relates to a liquid crystal display device for displaying character information and image information using a TN (twisted nematic) liquid crystal cell or an STN (super twisted nematic) liquid crystal cell and, more specifically, to a reflection-type liquid crystal display device and a transflective liquid crystal display device.

2. Description of the Related Art

As a conventional liquid crystal display device for displaying character information and image information by a liquid crystal display, there is, for example, one described in JP, 54-153066, A.

When character information and image information are displayed using a liquid crystal, a liquid crystal display device, as described in the aforementioned Laid-open, is used, in which absorption-type polarizing films each having a transmission axis and an absorption axis are disposed on the upper and lower sides, respectively, of a liquid crystal cell made by sealing the liquid crystal between two transparent substrates so that the transmission axes thereof are directed at predetermined angles.

When an electric field is applied to the liquid crystal display device, an alignment direction of the liquid crystal having permittivity anisotropy changes, and thus its optical characteristics change. Through the use of the optical anisotropy of the liquid crystal, a predetermined display is performed.

As a typical conventional liquid crystal display device described above, there is a reflection-type liquid crystal display device used with a twisted nematic (TN) liquid crystal sealed in a liquid crystal cell.

In this case, a linearly polarized light which has been made incident from the visible side and has passed through a first absorption-type polarizing film, its polarization direction being controlled by optical activity of the TN liquid crystal when passing through the liquid crystal cell, passes through a second absorption-type polarizing film or is absorbed there.

Therefore, the second absorption-type polarizing film is disposed so that when the TN liquid crystal has optical activity without application of voltage, a linearly polarized light which has been optically rotated by the TN liquid crystal passes through the second absorption-type polarizing film, and a white plate is disposed behind it, whereby the light reflected by the white plate is emitted out to the visible side via a reverse route, presenting a white display.

Meanwhile, the TN liquid crystal in a portion where a voltage is applied thereto loses the optical activity, whereby a linearly polarized light which has passed through the first absorption-type polarizing film is made incident on the second absorption-type polarizing film as it is and absorbed, and thus the light is not emitted out to the visible side, resulting in a black display. Accordingly, this case is a normally-white mode, in which character information and image information are displayed in black against a white background.

However, a display of character information and image information in black against the white background as described above has nothing especially novel appearance in visual design, offering neither excellent fashion nor particular interest.

Therefore, a liquid crystal display device is desired which is capable of providing variation in display state of character information and image information and additionally performing a display distinctive in design.

Moreover, in order to increase the amount of information such as character information and image information capable of displaying, it is necessary to use not a liquid crystal display device using the TN liquid crystal but a liquid crystal display device using a super twisted nematic (STN) liquid crystal which has highly sharp responsivity in optical characteristic change by application of voltage and is capable of a high-split display because a large margin can be obtained.

Since a liquid crystal display device using the STN liquid crystal is in a display mode using a birefringence anisotropy of the liquid crystal, a display color of the background to which no voltage is applied is colored due to an elliptically polarized light even if using a normally-white mode which is excellent in brightness for a monochrome display.

Consequently, the display color of the background is not white but a color close to yellowish green, and the display color of the black display portion to which voltage is applied becomes bluish black. Thus, even the reflection-type liquid crystal display device using the STN liquid crystal with a large display capacity and excellent contrast provides no change in design, resulting in a plain information display with little charm.

Therefore, it is desired to produce an information display in an achromatic color without coloring, new in design and fashionable, through the reflection-type liquid crystal display device using the STN liquid crystal.

This invention is made in view of the status quo, and its object is to provide a liquid crystal display device capable of providing variation in display of character information and image information, variation in design, and excellent fashion, and further increasing the capacity of information display.

SUMMARY OF THE INVENTION

To attain the above-described objects, a liquid crystal display device according to the present invention comprises: a TN liquid crystal cell constituted by sandwiching a nematic liquid crystal which is aligned at a twist angle of about 90° between a first and a second substrate each having transparent electrodes; an absorption-type polarizing film provided on the outside, which is the visible side of the TN liquid crystal cell, of the second substrate; and a reflection-type polarizing film, a scattering layer, and a mirror reflector provided in order on the outside, which is the opposite side to the visible side of the TN liquid crystal cell, of the first substrate, thereby constituting a reflection-type liquid crystal display device.

With this structure, a reflection display of information of character and image can be performed in an achromatic metallic tone with high contrast within a bright diffused white background to improve the visual design and fashion of the liquid crystal display device.

A liquid crystal display device according to the present invention may be constituted by comprising: an STN liquid crystal cell constituted by sandwiching a nematic liquid crystal which is aligned at a twist angle from 180° to 270° between a first and a second transparent substrate each having transparent electrodes; a retardation film and an absorption-type polarizing film provided in order on the outside, which is the visible side of the STN liquid crystal cell, of the second substrate; and a reflection-type polarizing film, a scattering layer, and a mirror reflector provided in order on the outside, which is the opposite side to the visible side of the STN liquid crystal cell, of the first substrate. This constitutes a reflection-type liquid crystal display device having a great display capacity in addition to the aforesaid effects, and also prevents coloring of a display.

The mirror reflector in each of these liquid crystal display devices is a mirror transflective reflector, and a backlight is provided on the outside of the mirror transflective reflector, thereby also constituting a transflective liquid crystal display device capable of reflection-type display by external light and transmission-type display by light emitted by the backlight.

In the liquid crystal display device including the STN liquid crystal cell and the retardation film, a Z-type retardation film which satisfies conditions of nx>nz>ny, where nx is a refractive index in a stretching direction of the retardation film, ny is a refractive index in a planar direction orthogonal to the stretching direction, and nz is a refractive index in a thickness direction, is used as the aforesaid retardation film, whereby viewing angle characteristics are improved to use also incident light from the surroundings efficiently, resulting in a brighter reflection display.

Further, it is preferable that the retardation film is a twisted retardation film, and a difference between an amount Rs of birefringence of the STN liquid crystal cell and a retardation value Rc of the twisted retardation film ranges from 0.15 μm to 0.25 μm.

This sufficiently prevents coloring of a metallic display portion while securing a sufficient amount of reflected light of the white display in the background.

The above and other objects, features and advantages of the invention will be apparent from the following detailed description which is to be read in conjunction with the accompanying drawings.

DETAILED DESCRIPTION OF THE PREFERRED EMBODIMENTS

Figure 1:
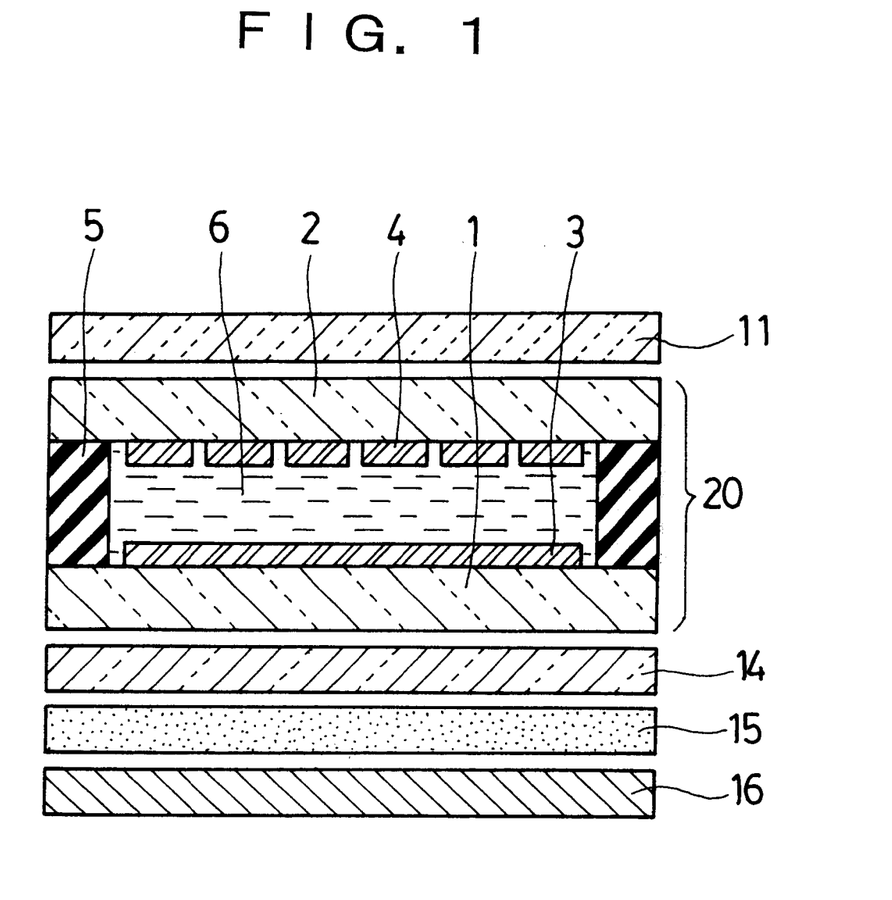
FIG. 1 is a schematic sectional view showing the structure of a first embodiment of a liquid crystal display device according to the present invention.
Figure 2:
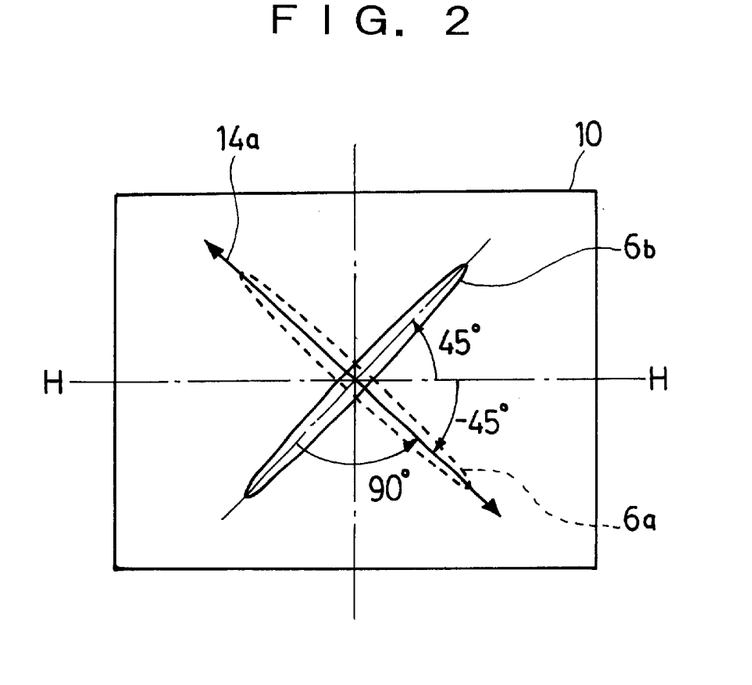
FIG. 2 is a view showing the relation between a molecular alignment direction of liquid crystal of a TN liquid crystal cell and a transmission axis of a reflection-type polarizing film of the same.
Figure 3:
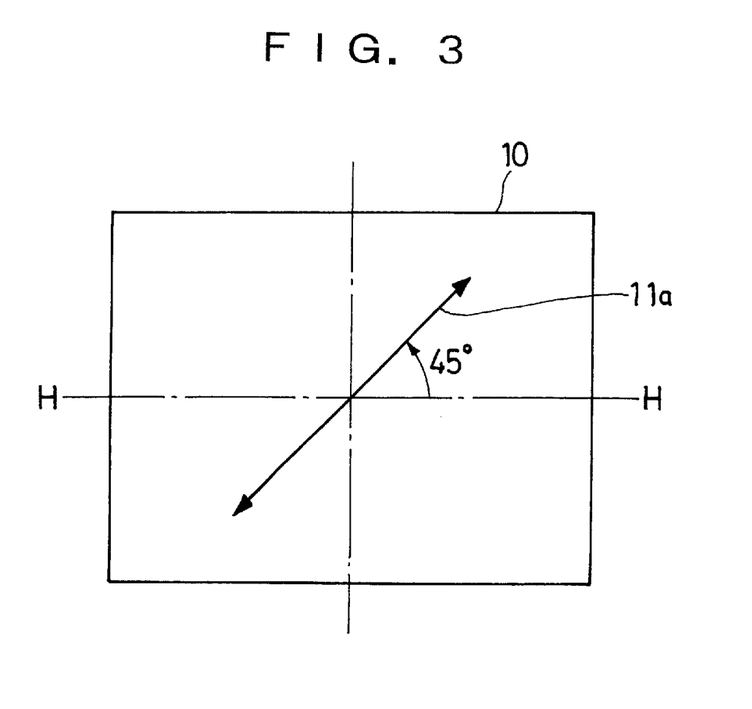
FIG. 3 is a view showing a direction of a transmission axis of an absorption-type polarizing film of the same.

Hereinafter, preferred embodiments of a liquid crystal display device according to the present invention will be concretely described with reference to the drawings.
First Embodiment: FIG. 1 to FIG. 3

First, the structure of the first embodiment of the liquid crystal display device according to the present invention will be explained with FIG. 1. FIG. 1 is a schematic sectional view showing the structure of the liquid crystal display device.

The liquid crystal display device includes a TN liquid crystal cell 20 in which a first substrate 1 composed of a transparent glass plate with a thickness of 0.5 mm and formed with first electrodes 3 made of an indium tin oxide (ITO) film which is a transparent conductive film and a second substrate 2 composed of a glass plate with a thickness of 0.5 mm and formed with second electrodes 4 made of an ITO film are bonded together at their peripheries with a sealing material 5, and a nematic liquid crystal 6 which is aligned at a twist angle of about 90° is sealed and sandwiched in a gap between the first substrate 1 and the second substrate 2.

The first electrodes 3 on the inner face of the first substrate 1 which are a large number of stripe-shaped electrodes arranged with slight spaces interposed between them are formed orthogonal to the second electrodes 4 on the inner face of the second substrate 2 which are a large number of stripe-shaped electrodes arranged with slight spaces interposed between them. Portions where the first electrodes 3 cross over and planarly overlap the second electrodes 4 form pixels respectively.

An absorption-type polarizing film 11 with a transmittance of 46% is provided on the outside (the upper side in FIG. 1), which is the visible side of the TN liquid crystal cell 20, of the second substrate 2, a reflection-type polarizing film 14 is provided on the outside (the lower side in FIG. 1), which is the opposite side to the visible side of the TN liquid crystal cell 20, of the first substrate 1, a scattering layer 15 is provided on the outside of the reflection-type polarizing film 14, and further, a mirror reflector 16 is provided on the outside of the scattering layer 15 in order, thereby constituting a reflection-type liquid crystal display device.

The absorption-type polarizing film 11 here is a typical polarizing film, that is, a sheet-shaped polarizing film which has an absorption axis for absorbing a linearly polarized light polarized in a direction orthogonal to its transmission axis, but the reflection-type polarizing film 14 is a sheet-shaped polarizing film which has a reflection axis for reflecting a linearly polarized light polarized in a direction orthogonal to its transmission axis.

Therefore, in the arrangement of the scattering layer 15 and the mirror reflector 16 on the outside of the reflection-type polarizing film 14, when a linearly polarized light polarized in a direction parallel to the transmission axis of the reflection-type polarizing film 14 is made incident, its diffused light is reflected, thereby presenting a bright white display, and when a linearly polarized light polarized in a direction parallel to the reflection axis of the reflection-type polarizing film 14 is made incident, the light is directly reflected by the reflection-type polarizing film 14, thereby obtaining a bright display in a metallic tone because the reflection efficiency of the reflection-type polarizing film 14 is high by virtue of its surface in a mirror face state. This embodiment employs an optical film DBEF (trade name) manufactured by Sumitomo 3M Ltd, as the reflection-type polarizing film 14.

This reflection-type polarizing film is formed of multi-layered thin films with different refractive indices, and in addition to this, a polarizing film composed of a cholesteric liquid crystal polymer sandwiched between λ/4 (quarter wavelength) films or one utilizing a hologram is applicable.

The scattering layer 15 is provided to scatter the light reflected by the mirror reflector 16 to obtain a bright display within a wide viewing angle.

Incident light from the outside is preferably scattered forward and passes through as much as possible with less scatter backward so as to obtain a high contrast. A scattering adhesive with a thickness of 30 $\mu$m made by mixing beads with different refractive indices into an adhesive to provide a diffusing effect is used here as the scattering layer 15.

The mirror reflector 16 in this embodiment is a reflector for mirror-reflecting all the incident light, and employs, for example, one made by forming a metallic thin film with a thickness of 100 nm made of aluminum or silver on a polyethylene terephthalate (PET) film by evaporation, sputtering, or the like.

Next, the relationship between the thickness of the first substrate 1 of the TN liquid crystal cell 20 and display quality will be explained. A light that is made incident on the TN liquid crystal cell 20 from the front passes through the absorption-type polarizing film 11, the second substrate 2 and the nematic liquid crystal 6 of the TN liquid crystal cell 20 and further passes through the first substrate 1, and then it is reflected by the reflection-type polarizing film 14, passing through the same way as that of the incident light to be emitted out to the observer's side (the visible side) as an emitting-out light.

However, if the first substrate 1 of the TN liquid crystal cell 20 is thick, a liquid crystal layer through which a light that is made incident in a slanting direction has passed when it is made incident differs from a liquid crystal layer through which the light passes when it is emitted out, thereby causing a double image in which a display portion appears blurry, resulting in a deterioration in display quality.

Accordingly, the thinner the first substrate 1 is, the more the double image by the incident light in the slanting direction decreases, resulting in increased visibility of display. When the first substrate 1 was tested using glass substrates having various thicknesses, an excellent display quality was obtained in a case of a thickness of 0.5 mm or less.

The thinner the first substrate 1 is, the better display quality becomes, however, its strength and workability deteriorate if the first substrate 1 is too thin, and therefore it is preferable to have a thickness of 0.1 mm or more. In this embodiment, glass plates having thicknesses of 0.5 mm are used as both the first substrate 1 and the second substrate 2.

The transmittances of the first electrodes 3 and the second electrodes 4 made of ITO films are important in terms of brightness and color tone, and thus ITO films with high transmittances are required. The ITO films forming the electrodes, however, increase in film thickness and decrease in transmittance of light as the sheet resistance values are decreased.

Thus, since the first electrodes 3 are applied with a data signal at a low voltage, having little influence of cross-talk, a thin ITO film with a sheet resistance value of 100 ohms and a film thickness of 40 nm is used for them, thereby bringing the average transmittance of the first electrodes 3 to about 92%.

Since the second electrodes 4 are applied with a scanning signal at a high voltage, it is necessary to decrease a sheet resistance value to about 10 ohms in order to reduce cross-talk, and thus a slight thick ITO film with a film thickness of 230 nm is used for them. Therefore, the average transmittance of the ITO films slightly lowers to about 89%. However, the brightness of display can be improved by employing transparent electrodes having a transmittance of 90% or more for at least the electrodes on one of the substrates.

The planar positional relations between components will be explained hereafter using FIG. 2 and FIG. 3.

On the surfaces of the first electrodes 3 and the second electrodes 4 of the TN liquid crystal cell 20, alignment layers (not shown) are formed respectively, and, as shown in FIG. 2, the alignment layer on the inner face of the first substrate 1 is subjected to a rubbing treatment in a direction at a 45° angle downward to the right with respect to the horizontal axis H—H of a display screen 10, whereby a lower molecular alignment direction 6a of the nematic liquid crystal 6 is disposed at a −45° angle.

Meanwhile, the alignment layer on the inner face of the second substrate 2 is subjected to a rubbing treatment in a direction at a 45° angle upward to the right with respect to the horizontal axis H—H of the display screen 10, whereby an upper molecular alignment direction 6b of the nematic liquid crystal 6 is disposed at a +45° angle. Generally, an angle in the clockwise direction is indicated by minus, and an angle in the counterclockwise direction by plus.

A very small quantity of a so-called "chiral" material which is an optical rotatory material is added to the nematic liquid crystal 6 with a viscosity of 20 cp, and the twist pitch P thereof is adjusted to 70 $\mu$m, thus forming the TN liquid crystal cell 20 with a twist angle Ts of 90° counterclockwise.

A transmission axis 14a of the reflection-type polarizing film 14 is directed at a −45° angle with respect to the horizontal axis H—H, and a transmission axis 11a of the absorption-type polarizing film 11 is directed at a +45° angle with respect to the horizontal axis H—H as shown in FIG. 3, so that the transmission axes 14a and 11a are arranged to be orthogonal to each other.

In the liquid crystal display device of this embodiment structured as described above, incident light from the visible side which is the upper side in FIG. 1 passes through the absorption-type polarizing film 11 to become a linearly polarized light polarized in the direction of the transmission axis 11a, and is optically rotated 90° when passing through the TN liquid crystal cell 20 where no voltage is applied between the first electrodes 3 and the second electrodes 4 of the TN liquid crystal cell 20 to become a linearly polarized light polarized in the direction of the transmission axis 14a of the reflection-type polarizing film 14. Accordingly, the light passes through the reflection-type polarizing film 14, and its diffused light reflected by the scattering layer 15 and the mirror reflector 16 is emitted out to the visible side via a reverse route, thereby presenting a bright achromatic white display.

When voltage is applied between the first electrodes 3 and the second electrodes 4, molecules of the nematic liquid crystal 6 of the TN liquid crystal cell 20 rise and the optical activity thereof is lost, and thus the linearly polarized light which has passed through the absorption-type polarizing film 11 passes through the TN liquid crystal cell 20 as it is, so that the polarization direction of the light made incident on the reflection-type polarizing film 14 is the direction of the reflection axis orthogonal to the transmission axis 14a. Therefore, the light is all reflected by the reflection-type polarizing film 14 and passes through the TN liquid crystal cell 20 and the absorption-type polarizing film 11 to be emitted out to the visible side, whereby a display color in a bright achromatic metallic tone can be observed.

Consequently, the background region where no voltage is applied is in a bright achromatic white display, in which information of character and image produced by the voltage-applied portion can be displayed in a bright metallic tone.

When the arrangement angle of the reflection-type polarizing film 14 is turned 90° so that the transmission axis 14a is directed in the same direction as that of the transmission axis 11a of the absorption-type polarizing film 11, the information of character and image can be displayed, conversely to the above-described case, in a bright white within the background in a metallic tone.

Figure 4:
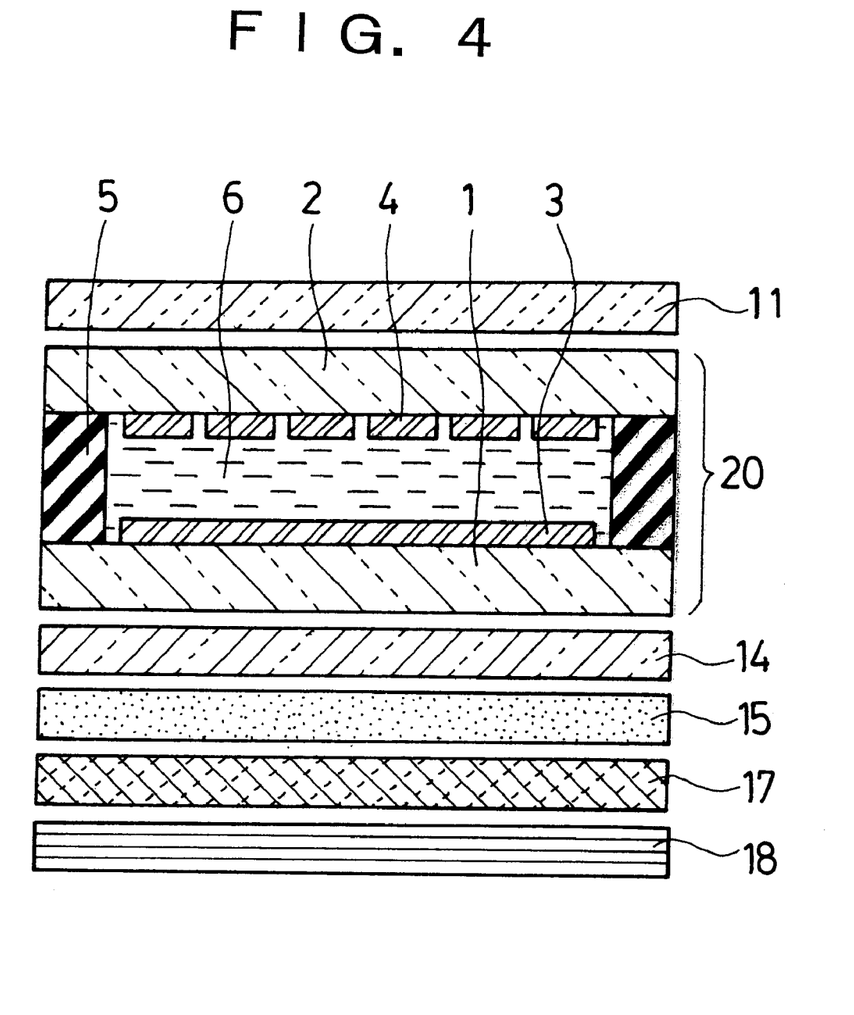
FIG. 4 is a schematic sectional view showing the structure of a second embodiment of a liquid crystal display device according to the present invention.
Figure 5:
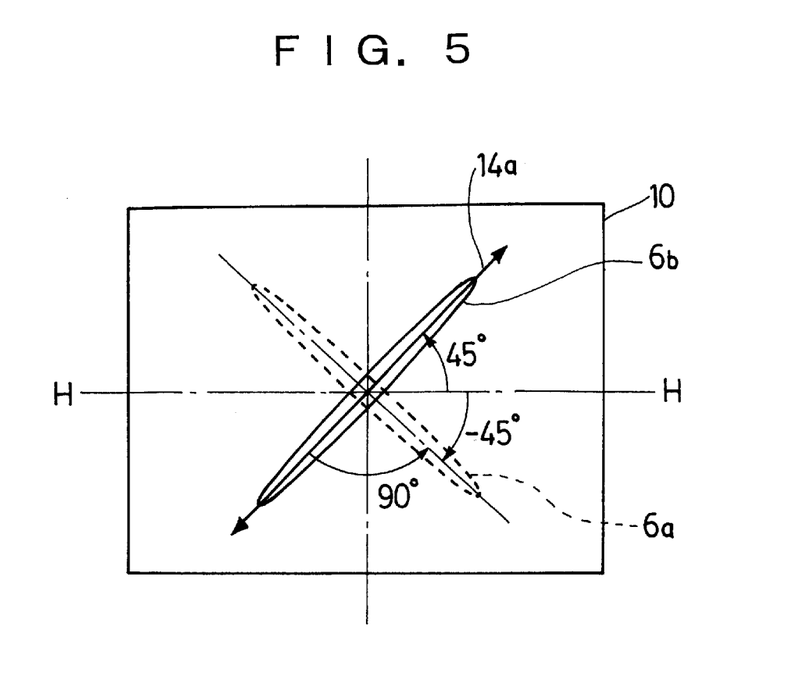
FIG. 5 is a view showing the relation between a molecular alignment direction of liquid crystal of a TN liquid crystal cell and a transmission axis of a reflection-type polarizing film of the same.
Figure 6:
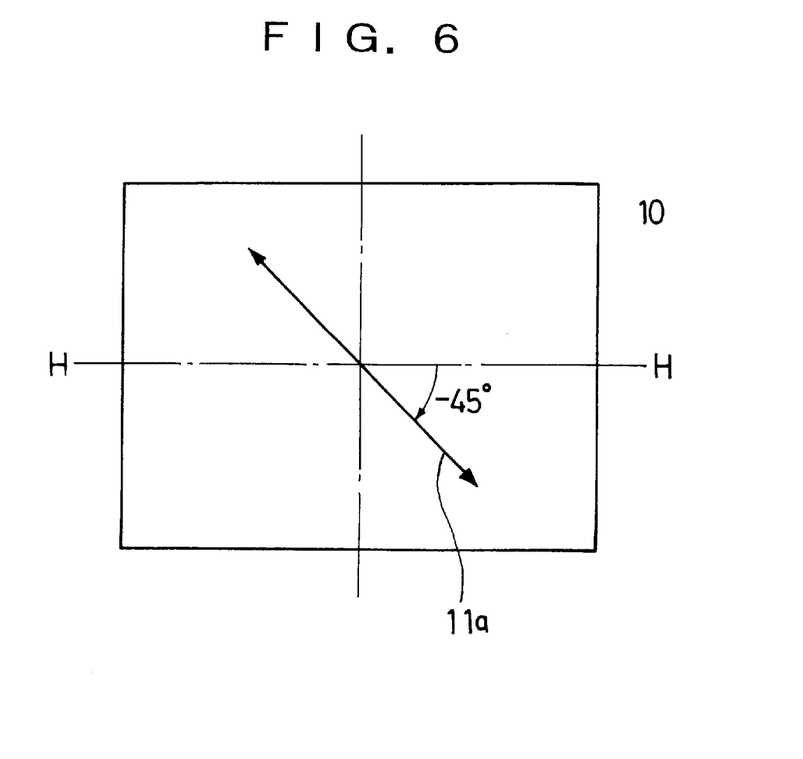
FIG. 6 is a view showing a direction of a transmission axis of an absorption-type polarizing film of the same.

Second Embodiment: FIG. 4 to FIG. 6

The second embodiment of a liquid crystal display device according to the present invention will be explained hereafter with reference to FIG. 4 to FIG. 6.

First, the structure of the liquid crystal display device will be explained with FIG. 4, which is a schematic sectional view similar to FIG. 1 of the above-described first embodiment, and thus the same numerals are given to portions corresponding to those in FIG. 1, and the description thereof is simplified or omitted.

In the liquid crystal display device of the second embodiment, a TN liquid crystal cell, an absorption-type polarizing film 11 provided on the outside, which is the visible side of the TN liquid crystal cell, of a second substrate 2, and a reflection-type polarizing film 14 and a scattering layer 15 provided in order on the outside, which is the opposite side to the visible side of the TN liquid crystal cell, of a first substrate 1 shown in FIG. 4 are the same as those used in the first embodiment.

The liquid crystal display device of the second embodiment is different in structure from that of the first embodiment shown in FIG. 1 in that a mirror transflective reflector 17 is provided on the outside of the scattering layer 15 (the lower side in FIG. 4) as a mirror reflector, and that a backlight is disposed on the outside of the mirror transflective reflector 17. This constitutes a transflective liquid crystal display device.

The mirror transflective reflector 17 employs a reflector formed into a so-called half mirror state film for transmitting part of incident light and reflecting the remainder which is made by forming a metallic thin film of aluminum or silver with a high reflectance to be a thickness of about 20 nm on a polyethylene terephthalate (PET) film by vacuum evaporation or sputtering to bring the transmittance to about 10% and the reflectance to about 70%.

The backlight 18 is an auxiliary light source, and it is preferable to use an electro-luminescent (EL) plate for it because it can be made a thin-type with low power consumption, but in addition to that, a light emitting diode (LED) to which a light guide plate is attached, a cold-cathode tube, a hot-cathode tube, or the like is applicable.

Further, it is suitable to use one made by applying pigments of a fluorescent color to a light-emitting face of the backlight 18 by printing to generate a fluorescent color.

The planar positional relations between components will be explained hereafter using FIG. 5 and FIG. 6.

A lower molecular alignment direction 6a of a nematic liquid crystal 6 sealed in a TN liquid crystal cell 20 is disposed at a −45° angle, and an upper molecular alignment direction 6b thereof is disposed at a +45° angle, thus forming the TN liquid crystal cell 20 with a twist angle Ts of 90° counterclockwise, which is the same as in the first embodiment explained with FIG. 2.

A transmission axis 14a of the reflection-type polarizing film 14 is directed at a +45° angle with respect to the horizontal axis H—H of a display screen 10 as shown in FIG. 5, and a transmission axis 11a of the absorption-type polarizing film 11 is directed at a −45° angle with respect to the horizontal axis H—H as shown in FIG. 6. This arrangement is reverse to the case of the first embodiment explained with FIG. 2 and FIG. 3, but the transmission axis 14a of the reflection-type polarizing film 14 and the transmission axis 11a of the absorption-type polarizing film 11 are arranged to be orthogonal to each other.

In the liquid crystal display device of this embodiment structured as described above, a display state in which a reflection display is performed by an external light made incident from the upper visible side in FIG. 4 without turning on the backlight 18 is almost the same as in the first embodiment because the mirror transflective reflector 17 also reflects almost all the incident light. More specifically, information of character and image can be displayed in a bright metallic tone within a bright white background.

Further, the liquid crystal display device of this embodiment can perform a transmission display by turning on the backlight 18 in a dark external environment.

In this case, the light by light emission of the backlight 18 passes through the mirror transflective reflector 17 and is scattered when passing through the scattering layer 15 and becomes a linearly polarized light when passing through the reflection-type polarizing film to be made incident on the TN liquid crystal cell 20 from the lower side in FIG. 4. Within the region where no voltage is applied between the first and second electrodes 3 and 4, the linearly polarized light, its polarization direction being optically rotated 90° when passing through the nematic liquid crystal 6, is directed in the direction of the transmission axis 11a of the absorption-type polarizing film 11 and thus passes therethrough to be emitted out to the visible side, presenting a bright display by the scattered light of a luminescent color of the backlight 18.

Within the region where voltage is applied between the first and second electrodes 3 and 4, the optical activity of the nematic liquid crystal 6 is lost, and the linearly polarized light which has been made incident on the TN liquid crystal cell 20 passes through the nematic liquid crystal 6 as it is with its polarization direction orthogonal to the transmission axis 11a of the absorption-type polarizing film 11 and is thus absorbed by the absorption-type polarizing film 11, not emitted to the visible side, resulting in a black display.

Consequently, in the case of the transmission display, information of character and image can be displayed in black within a bright background by the scattered light of a luminescent color of the backlight 18.

The arrangement of the reflection-type polarizing film 14 and the absorption-type polarizing film 11 to match the directions of the respective transmission axes 14a and 11a with each other can reverse the relation between the background color and the display color of information in both cases of the reflection display and the transmission display.

Figure 7:
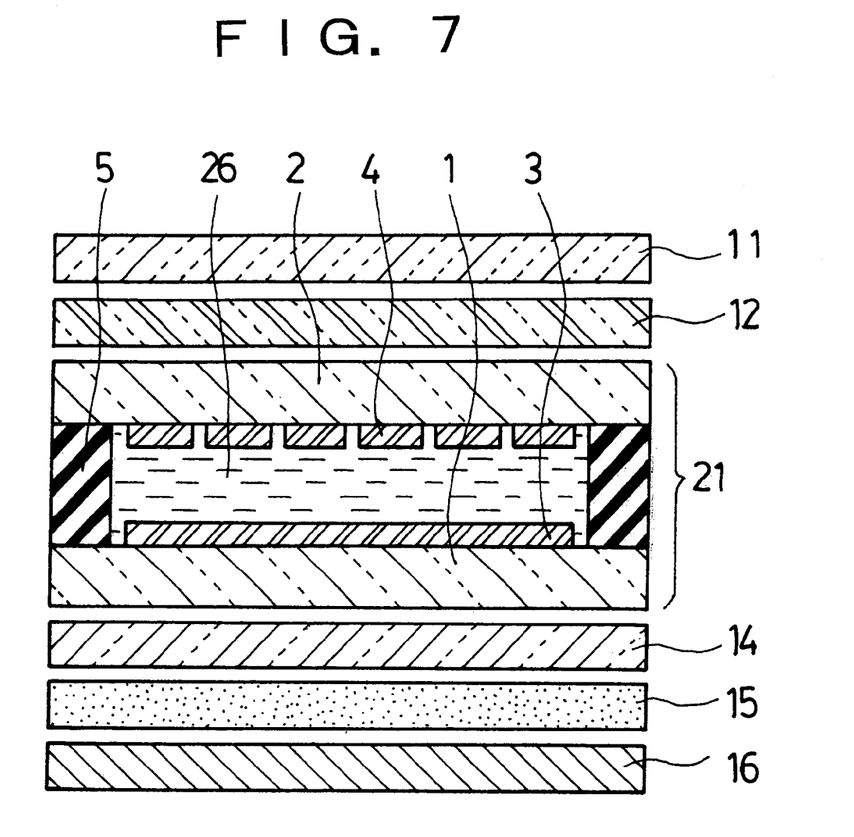
FIG. 7 is a schematic sectional view showing the structure of a third embodiment of a liquid crystal display device according to the present invention.
Figure 8:
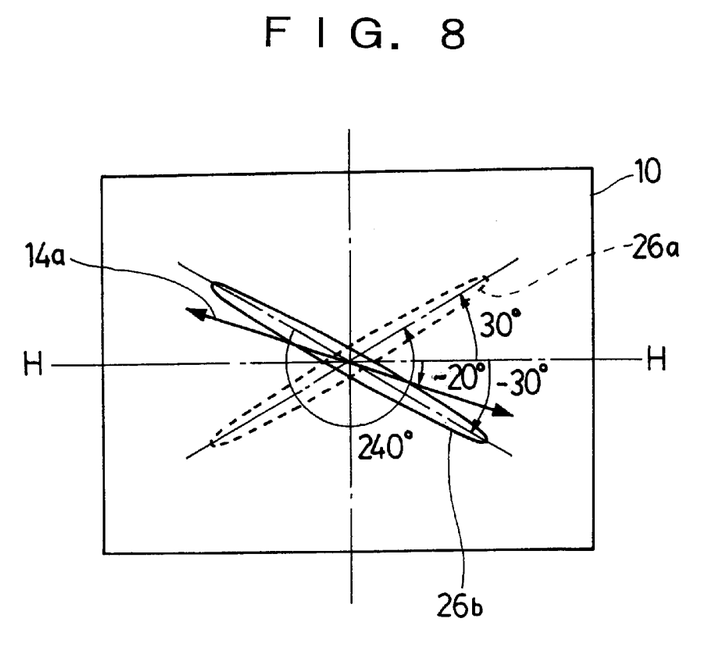
FIG. 8 is a view showing the relation between a molecular alignment direction of liquid crystal of an STN liquid crystal cell and a transmission axis of a reflection-type polarizing film of the same.
Figure 9:
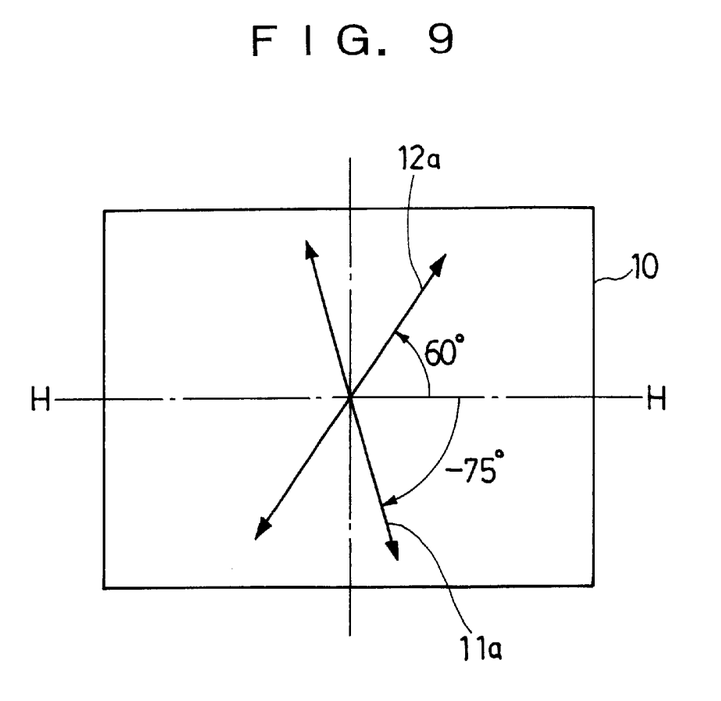
FIG. 9 is a view showing the relation between a transmission axis of an absorption-type polarizing film and a stretching axis of a retardation film of the same.

Third Embodiment: FIG. 7 to FIG. 9

The third embodiment of a liquid crystal display device according to the present invention will be explained hereafter with reference to FIG. 7 to FIG. 9.

First, the structure of the liquid crystal display device will be explained with FIG. 7. FIG. 7 is a view similar to FIG. 1 of the above-described first embodiment, and thus the same numerals are given to portions corresponding to those in FIG. 1, and the description thereof is simplified or omitted.

The liquid crystal display device of the third embodiment is different in structure from that of the first embodiment in that a super twisted nematic (STN) liquid crystal cell 21 is used in place of the TN liquid crystal cell 20 in the liquid crystal display device shown in FIG. 1, and that a retardation film 12 is provided between a second substrate 2 of the STN liquid crystal cell 21 and an absorption-type polarizing film 11.

In the STN liquid crystal cell 21, a first substrate 1 composed of a glass plate with a thickness of 0.5 mm and formed with first electrodes 3 made of an indium tin oxide (ITO) film which is a transparent conductive film and the second substrate 2 composed of a glass plate with a thickness of 0.5 mm and formed with second electrodes 4 made of an ITO film are bonded together at their peripheries with a sealing material 5, and a nematic liquid crystal 26 which is aligned at a twist angle of 240° is sealed and sandwiched in a gap between the first substrate 1 and the second substrate 2.

The retardation film 12 and the absorption-type polarizing film 11 are arranged in order on the outside, which is the visible side of the STN liquid crystal cell 21, of the second substrate 2, and a reflection-type polarizing film 14, a scattering layer 15, and a mirror reflector 16 are arranged in order on the outside, which is the opposite side to the visible side, of the first substrate 1, as in the first embodiment, thereby constituting a reflection-type liquid crystal display device.

The absorption-type polarizing film 11, the reflection-type polarizing film 14, the scattering layer 15, and the mirror reflector 16 are the same as those used in the first embodiment.

The retardation film 12 is a transparent film with a thickness of about 70 $\mu$m made of multi-axially stretched polycarbonate (PC) having a great wavelength dependence of refractive index, which is a retardation film (a so-called Z-type retardation film) satisfying conditions of nx>nz>ny, where nx is a refractive index in a stretching direction, ny is a refractive index in a planar direction orthogonal to the stretching direction, and nz is a refractive index in a thickness direction, and is bonded to the absorption-type polarizing film 11 with an acrylic adhesive to be integrated.

The Z-type retardation film has less variation in retardation when the viewing angle is slanted and thus results in improved viewing angle characteristics of the liquid crystal display device.

The planar positional relations between components will be explained hereafter using FIG. 8 and FIG. 9.

On the surfaces of the first electrodes 3 and the second electrodes 4 of the STN liquid crystal cell 21, alignment layers (not shown) are formed respectively, and, as shown in FIG. 8, the alignment layer on the inner face of the first substrate 1 is subjected to a rubbing treatment in a direction at a 30° angle upward to the right with respect to the horizontal axis H—H of a display screen 10, whereby a lower molecular alignment direction 26a of liquid crystal is disposed at a +30° angle. The alignment layer on the inner face of the second substrate 2 is subjected to a rubbing treatment in a direction at a 30° angle downward to the right, whereby an upper molecular alignment direction 26b of liquid crystal is disposed at a −30° angle.

A so-called "chiral" material which is an optical rotatory material is added to the nematic liquid crystal 26 with a viscosity of 20 cp, and the twist pitch P thereof is adjusted to 11 $\mu$m, thus forming the STN liquid crystal cell 21 with a twist angle Ts of 240° counterclockwise.

A difference $\Delta$n in birefringence of the nematic liquid crystal 26 in used is set to 0.15 and a cell gap d which is a gap between the first substrate 1 and the second substrate 2 is set to 5.6 $\mu$m. Accordingly, an amount of birefringence Rs, which is a $\Delta$nd value of the STN liquid crystal cell 21, represented by the product of the difference $\Delta$n in the birefringence of the nematic liquid crystal 26 and the cell gap d, is 0.84 $\mu$m. A retardation value Rf of the retardation film 12 is 0.58 $\mu$m.

A transmission axis 14a of the reflection-type polarizing film 14 is directed at a −20° angle with respect to the horizontal axis H—H of the display screen 10 as shown in FIG. 8, and a transmission axis 11a of the absorption-type polarizing film 11 is directed at a −75° angle with respect to the horizontal axis H—H of the display screen 10 as shown in FIG. 9, and a stretching axis 12a of the retardation film 12 is directed at a +60° angle with respect to the horizontal axis H—H.

In the liquid crystal display device of the third embodiment structured as described above, in the state where no voltage is applied between the electrodes 3 and 4 of the STN liquid crystal cell 21, a linearly polarized light made incident from the visible side (the upper side in FIG. 7) through the absorption-type polarizing film 11 and polarized in the direction of the transmission axis 11a thereof becomes an elliptically polarized light after passing through the STN liquid crystal cell 21 in the case in which there is no retardation film 12. However, since the retardation film 12 is disposed between the absorption-type polarizing film 11 and the STN liquid crystal cell 21, the linearly polarized light made incident through the absorption-type polarizing film 11 becomes an elliptically polarized light state after passing through the retardation film 12, and the light, its elliptically polarized light state being corrected while passing through the STN liquid crystal cell 21, becomes an almost linearly polarized light and is emitted out with being rotated 55° left-handed with respect to the transmission axis 11a of the absorption-type polarizing film 11.

Since the reflection-type polarizing film 14 is arranged so that the transmission axis 14a thereof is directed at a −20° angle with respect to the horizontal axis H—H as shown in FIG. 8, almost all the incident light made incident on the reflection-type polarizing film 14 passes therethrough because the polarization direction of the light matches with the direction of the transmission axis 14a. Then, the light scattered by the scattering layer and reflected by the mirror reflector 16 passes via a reverse route and is emitted out to the visible side, presenting a bright achromatic white display.

When voltage is applied between the electrodes 3 and 4 of the STN liquid crystal cell 21, molecules of the nematic liquid crystal 26 thereof rise and thus the amount of birefringence changes, whereby the linearly polarized light which has passed through the STN liquid crystal cell 21, its polarization direction becoming nearly orthogonal to the transmission axis 14a of the reflection-type polarizing film 14, is almost mirror-reflected by the reflection-type polarizing film 14 to be emitted out to the visible side. Thereby, a display color in a bright achromatic metallic tone can be observed.

Consequently, also with this liquid crystal display device, information of character and image can be displayed in a bright achromatic metallic tone within a background in a bright achromatic scattering white display without coloring. Additionally, the use of the STN liquid crystal cell 21 can further increase the capacity of information display as compared with the liquid crystal display device of the first embodiment.

Further, it is preferable to increase the amount of light passing through the reflection-type polarizing film 14 to the maximum and to optimize the STN liquid crystal cell 21 so that the transmittance becomes high within a wide range of wavelength. More specifically, by optimizing the setting of a retardation Rf of the retardation film 12 and Rs=Δnd, which is the product of birefringence Δn of the nematic liquid crystal 26 and a cell gap d, and arrangement angles of the transmission axis of the absorption-type polarizing film 11, the stretching axis of the retardation film 12, and the transmission axis of the reflection-type polarizing film 14, the reflection efficiency is enhanced, resulting in a better display state.

Moreover, the aforementioned Z-type retardation film satisfying conditions of nx>nz>ny is used as the retardation film 12, thereby improving the viewing angle characteristics. The improved viewing angle characteristics allow light to be made incident in various directions, resulting in a brighter display in a metallic tone, whereby a liquid crystal display device with better visibility can be obtained.

Figure 10:
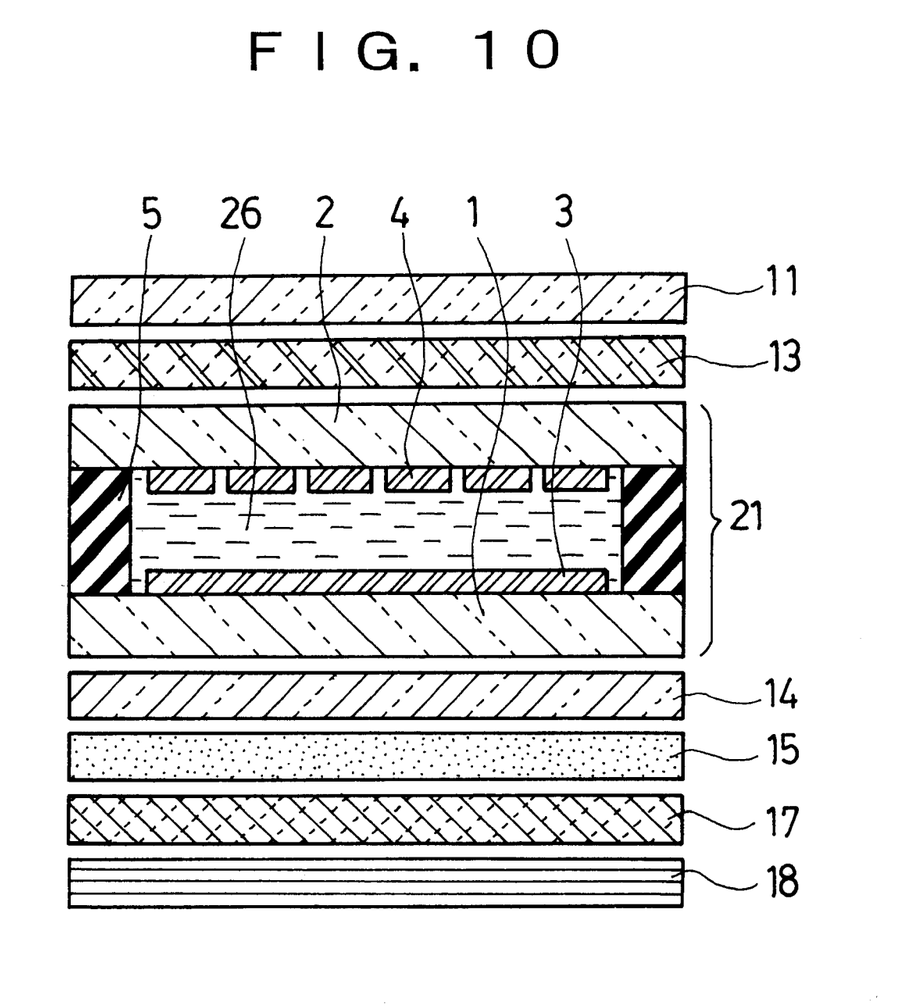
FIG. 10 is a schematic sectional view showing the structure of a fourth embodiment of a liquid crystal display device according to the present invention.
Figure 11:
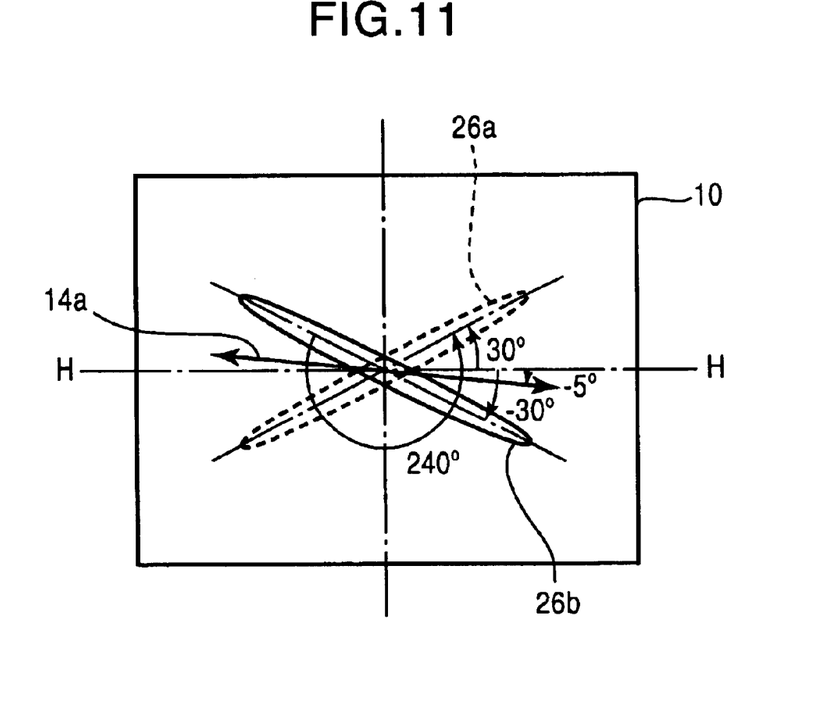
FIG. 11 is a view showing the relation between a molecular alignment direction of liquid crystal of an STN liquid crystal cell and a transmission axis of a reflection-type polarizing film of the same.
Figure 12:
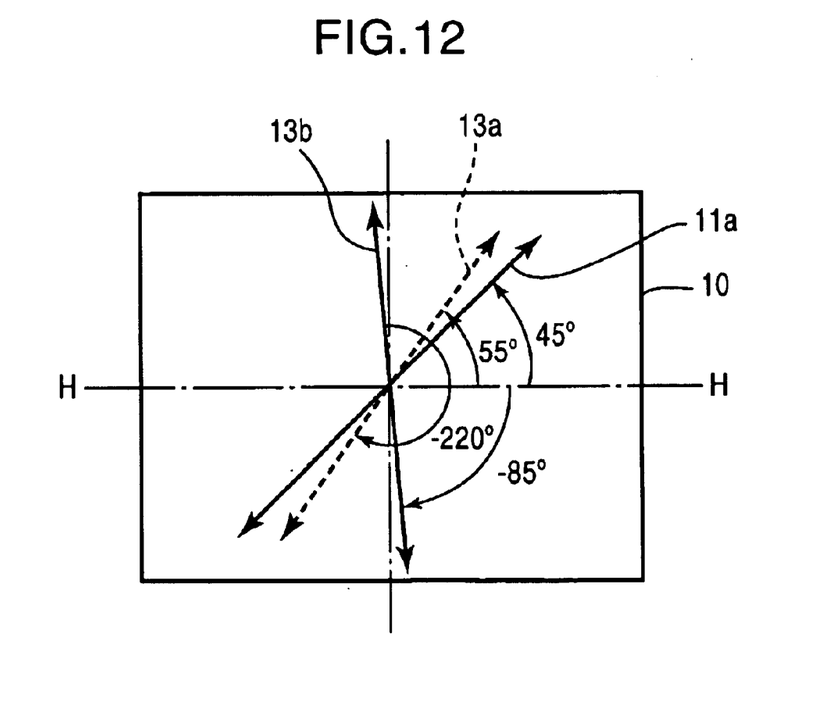
FIG. 12 is a view showing the relation between a transmission axis of an absorption-type polarizing film and a molecular alignment direction of a twisted retardation film of the same.

Fourth Embodiment: FIG. 10 to FIG. 12

The fourth embodiment of a liquid crystal display device according to the present invention will be explained hereafter with reference to FIG. 10 to FIG. 12.

First, the structure of the liquid crystal display device will be explained with FIG. 10. FIG. 10 is a view similar to FIG. 4 of the above-described second embodiment and FIG. 7 of the third embodiment, and thus the same numerals are given to portions corresponding to those in FIG. 4 and FIG. 7, and the description thereof is simplified or omitted.

The reflection-type liquid crystal display device of the fourth embodiment constitutes a transflective liquid crystal display device similar to that of the second embodiment and is different in structure from that of the third embodiment in that the mirror reflector 16 in the third embodiment is replaced with a mirror transflective reflector 17 which is the same as that of the second embodiment and a backlight 18 is disposed outside the mirror transflective reflector 17, and that the retardation film 12 is replaced with a twisted retardation film 13.

The structure of the STN liquid crystal cell 21 is the same as that in the third embodiment, and the structure of an absorption-type polarizing film 11, a reflection-type polarizing film 14, a scattering layer 15, the mirror transflective reflector 17, and the backlight 18 are the same as those in the second embodiment.

The twisted retardation film 13 is a film made by applying a liquid crystal polymer material having a twist structure to a triacetyl cellulose (TAC) film or a polyethylene terephthalate (PET) film after an aligning treatment, making it into a liquid crystal state at a high temperature of about 150° C., adjusting the twist angle, and thereafter cooling it rapidly to room temperature to fix the twisted state.

This embodiment employs the twisted retardation film 13 twisted right-handed with a twist angle Tc of −220° and Rc, which is a Δnd value representing birefringence, of 0.61 μm.

The planar positional relations between components of this liquid crystal display device will be explained hereafter using FIG. 11 and FIG. 12. A lower molecular alignment direction 26a of liquid crystal of the STN liquid crystal cell 21 is disposed at a +30° angle, and an upper molecular alignment direction 26b of liquid crystal is disposed at a −30° angle, which are the same as those of the STN liquid crystal display cell 21 in the third embodiment.

Accordingly, a twist angle Ts of a nematic liquid crystal 26 is 240° counterclockwise and a difference Δn in its birefringence is 0.15, which are the same as those in the third embodiment, but a cell gap d, a gap between a first substrate 1 and a second substrate 2 of the STN liquid crystal cell 21 is 5.4 μm, which is slightly different from that of the third embodiment. Therefore, an amount of birefringence Rs, which is a Δnd value of the STN liquid crystal cell 21, represented by the product of the difference Δn in the birefringence of the nematic liquid crystal 26 and the cell gap d, is 0.81 μm.

The retardation value Rc of the twisted retardation film is 0.61 μm, and thus a difference ΔR from the amount of birefringence Rs of the nematic liquid crystal 26 results in ΔR=|Rs−Rc|=0.2 μm.

As the ΔR decreases, a display portion in a metallic tone is colored and gradually turns yellow, and conversely as the ΔR increases, reflected light in the white display portion of the background is reduced, whereby the entire display becomes darker. Therefore, the value of ΔR preferably ranges from 0.15 μm to 0.25 μm.

A transmission axis 14a of the reflection-type polarizing film 14 is disposed at a −5° angle with respect to the horizontal axis H—H of a display screen 10 as shown in FIG. 11, and a transmission axis 11a of the absorption-type polarizing film 11 is directed at a +45° angle with respect to the horizontal axis H—H of the display screen 10 as shown in FIG. 12. Further, a lower molecular alignment direction 13a of the twisted retardation film 13 is directed at a +55° angle with respect to the horizontal axis H—H, and an upper molecular alignment direction 13b is directed at a −85° angle, resulting in a right-handed state with a twist angle Tc of −220°.

Accordingly, in this embodiment, a twist angle Ts of the nematic liquid crystal 26 is 240°, and the twist angle Tc of the twisted retardation film 13 is −220°, and thus a value of a difference ΔT=|Ts|−|Tc| in absolute value of both the twist angles is 20°, so that an extremely excellent reflection display can be obtained. Incidentally, the value of ΔT is not limited to 20°, but if it ranges from 0° to 30°, an excellent reflection display for practical use can be obtained. However, when the value of ΔT becomes negative (the absolute value of Tc becomes greater than the absolute value of Ts) or exceeds 30°, the display portion in a metallic tone is colored, and contrast to the background portion also decreases, resulting in deterioration in display quality.

Also with the liquid crystal display device of this embodiment structured as above, in the case of reflection display by an external light made incident from the visible side (the upper side in FIG. 10), information of character and image can be displayed in a bright achromatic metallic tone within a background in a bright achromatic scattering white display without coloring as in the third embodiment, and the capacity of information display can also be increased.

Further, the use of the twisted retardation film improves the viewing angle characteristics in the reflection display, resulting in a brighter display in a metallic tone, whereby a liquid crystal display device with better visibility can be obtained.

Furthermore, in the case of the transmission display by turning on the backlight 18, information of character and image can be displayed in black within a bright background by the scattered light of a luminescent color of the backlight 18 as in the transmission display by the liquid crystal display device of the second embodiment.

It should be noted that a liquid crystal polymer film, of which the twisted state is fixed at room temperature, is used as the twisted retardation film 13 in this embodiment, but by the use of a temperature-compensation-type twisted retardation film, in which only parts of liquid crystal molecules are bound together into polymer molecules in a chain state and Rc thereof varies with temperature, brightness and contrast at high temperatures are improved, and thus performing a better reflection display.

Modification of the Embodiments

The STN liquid crystal cell 21 with a twist angle Ts of 240° and an amount of birefringence Rs of 0.81 μm is used as an STN liquid crystal cell in the above-described liquid crystal display device of the fourth embodiment, but even if using an STN liquid crystal cell with a twist angle Ts ranging from 180° to 270° and an amount of birefringence Rs ranging from 0.7 μM to 1.0 μm, the same display device can be obtained by optimizing the arrangement angles of the absorption-type polarizing film 11, the twisted retardation film 13, and the reflection-type polarizing film 14.

Although a glass substrate with a thickness of 0.5 mm is used as the first substrate 1 in each embodiment of the present invention, the thinner the first substrate 1 is, the better display quality can be obtained. However, if the first substrate 1 is too thin, the strength and the workability deteriorate, and therefore it is preferable to use a glass substrate with a thickness from about 0.1 mm to about 0.5 mm.

Further, the same liquid crystal display device can be fabricated even by using transparent plastic substrates such as polyethylene terephthalate (PET) in place of glass as materials of the first substrate 1 and the second substrate 2.

Effect of the Invention

As is clear from the above explanation, according to the present invention, it is possible to provide a reflection-type liquid crystal display device capable of displaying information of character and image in an achromatic metallic tone with high contrast within a bright diffused white background and a transflective liquid crystal display device capable of also a transmission display by a backlight through the use of a TN liquid crystal cell or an STN liquid crystal cell, thereby realizing a liquid crystal display device with variation in visual design and excellence in fashion.

Even when the capacity of information display is increased using the STN liquid crystal cell 21, information can be displayed in an achromatic metallic tone with high contrast within a bright achromatic white background without coloring.

What is claimed is:

1. A liquid crystal display device comprising:
    a TN liquid crystal cell constituted by sandwiching a nematic liquid crystal which is aligned at a twist angle of about 90° between a first and a second transparent substrate each having transparent electrodes;
    an absorption-type polarizing film provided on the outside, which is the visible side of said TN liquid crystal cell, of said second substrate;
    a reflection-type polarizing film provided on the outside, which is the opposite side to the visible side of said TN liquid crystal cell, of said first substrate;
    a scattering layer provided on the outside of said reflection-type polarizing film; and
    a mirror reflector provided on the outside of said scattering layer reflecting light only incident from the visible side of said liquid crystal cell.

2. A liquid crystal display device according to claim 1, comprising:
    a TN liquid crystal cell constituted by sandwiching a nematic liquid crystal which is aligned at a twist angle of about 90° between a first and a second transparent substrate each having transparent electrodes;
    an absorption-type polarizing film provided on the outside, which is the visible side of said TN liquid crystal cell, of said second substrate;
    a reflection-type polarizing film provided on the outside, which is the opposite side to the visible side of said TN liquid crystal cell, of said first substrate;
    a scattering layer provided on the outside of said reflection-type polarizing film; and
    a mirror reflector provided on the outside of said scattering layer,
    wherein said mirror reflector is a mirror transflective reflector, and a backlight is provided on the outside of said mirror transflective reflector.

3. A liquid crystal display device comprising:
    an STN liquid crystal cell constituted by sandwiching a nematic liquid crystal which is aligned at a twist angle from 180° to 270° between a first and a second transparent substrate each having transparent electrodes;
    an absorption-type polarizing film provided on the outside, which is the visible side of said STN liquid crystal cell, of said second substrate;
    a retardation film provided between said absorption-type polarizing film and said second substrate;
    a reflection-type polarizing film provided on the outside, which is the opposite side to the visible side of said STN liquid crystal cell, of said first substrate;
    a scattering layer provided on the outside of said reflection-type polarizing film; and
    a mirror reflector provided on the outside of said scattering layer reflecting light only incident from the visible side of said liquid crystal cell.

4. A liquid crystal display device according to claim 3, wherein said retardation film satisfies conditions of:

$$nx>nz>ny$$

where nx is a refractive index in a stretching direction of said retardation film, ny is a refractive index in a planar direction orthogonal to the stretching direction, and nz is a refractive index in a thickness direction.

5. A liquid crystal display device according to claim 3, wherein said retardation film is a twisted retardation film, and a difference between an amount of birefringence of said STN liquid crystal cell and a retardation value of said twisted retardation film ranges from 0.15 μm to 0.25 μm.

6. A liquid crystal display device according to claim 3, wherein said retardation film is a twisted retardation film, and a value of $\Delta T=|Ts|-|Tc|$ ranges from 0° to 30° where ΔT is a difference between an absolute value of a twist angle Ts of said STN liquid crystal cell and an absolute value of a twist angle Tc of said twisted retardation film.

7. A liquid crystal display device comprising:
    an STN liquid crystal cell constituted by sandwiching a nematic liquid crystal which is aligned at a twist angle from 180° to 270° between a first and a second transparent substrate each having transparent electrodes;
    an absorption-type polarizing film provided on the outside, which is the visible side of said STN liquid crystal cell, of said second substrate;

a retardation film provided between said absorption-type polarizing film and said second substrate;

a reflection-type polarizing film provided on the outside, which is the opposite side to the visible side of said STN liquid crystal cell, of said first substrate;

a scattering layer provided on the outside of said reflection-type polarizing film; and a mirror reflector provided on the outside of said scattering layer, wherein said mirror reflector is a mirror transflective reflector, and a backlight is provided on the outside of said mirror transflective reflector.

8. A liquid crystal display device according to claim 7 wherein said retardation film satisfies conditions of:

$$nx > nz > ny$$

where nx is a refractive index in a stretching direction of said retardation film, ny is a refractive index in a planar direction orthogonal to the stretching direction, and nz is a refractive index in a thickness direction.

9. A liquid crystal display device according to claim 7, wherein said retardation film is a twisted retardation film, and a difference between an amount of birefringence of said STN liquid crystal cell and a retardation value of said twisted retardation film ranges from 0.15 μm to 0.25 μm.

10. A liquid crystal display device according to claim 7, wherein said retardation film is a twisted retardation film, and a value of $\Delta T = |Ts| - |Tc|$ ranges from 0° to 30° where $\Delta T$ is a difference between an absolute value of a twist angle Ts of said STN liquid crystal cell and an absolute value of a twist angle Tc of said twisted retardation film.

* * * * *

UNITED STATES PATENT AND TRADEMARK OFFICE
CERTIFICATE OF CORRECTION

PATENT NO.    : 6,717,641 B2
DATED         : April 6, 2004
INVENTOR(S)   : Makoto Arai

It is certified that error appears in the above-identified patent and that said Letters Patent is hereby corrected as shown below:

Column 13,
Line 66, delete "according to claim 1".

Colummn 15,
Lines 11-13, delete "transfiective" and insert -- transflective --.

Signed and Sealed this

Thirteenth Day of July, 2004

JON W. DUDAS
*Acting Director of the United States Patent and Trademark Office*